United States Patent [19]

Reaney

[11] Patent Number: 4,907,838
[45] Date of Patent: Mar. 13, 1990

[54] VEHICLE BODY ASSEMBLY

[75] Inventor: Derek J. Reaney, Nuneaton, United Kingdom

[73] Assignee: Jaguar Cars Limited, United Kingdom

[21] Appl. No.: 230,014

[22] Filed: Aug. 8, 1988

[30] Foreign Application Priority Data

Aug. 7, 1987 [GB] United Kingdom ............... 8718787

[51] Int. Cl.[4] ............................................. B60J 5/02
[52] U.S. Cl. ..................................... 296/202; 296/146
[58] Field of Search ............... 296/202, 201, 146, 194

[56] References Cited

U.S. PATENT DOCUMENTS

| | | | |
|---|---|---|---|
| 2,733,096 | 1/1956 | Waterhouse | 296/202 |
| 4,496,186 | 1/1985 | Tuchiya et al. | 296/146 |
| 4,653,801 | 3/1987 | Shirasu et al. | 296/202 |
| 4,709,957 | 12/1987 | Ohya | 296/146 |

FOREIGN PATENT DOCUMENTS 178974 11/1982 Japan .

Primary Examiner—Robert R. Song
Attorney, Agent, or Firm—Davis, Bujold & Streck

[57] ABSTRACT

A vehicle body assembly comprises a pillar assembly and a vehicle door including a quarterglass frame in which the quarterglass frame is provided with a channel member which in the closed position of the door engages around at least a part of the pillar assembly. The channel member thus provides support for the pillar assembly in the event of the vehicle overturning but readily disengages from the pillar assembly when the door is opened.

7 Claims, 1 Drawing Sheet

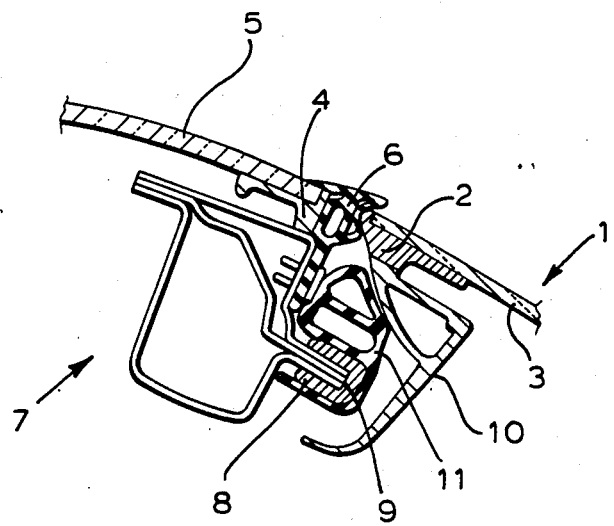

VEHICLE BODY ASSEMBLY

FIELD OF THE INVENTION

The present invention relates to a vehicle body assembly and more particularly relates to a vehicle body assembly in which a vehicle door interlocks with a body pillar assembly to provide support for the pillar assembly in the event of the vehicle overturning.

DESCRIPTION OF PRIOR ART

It is conventional to assemble a vehicle body in such a way as to inhibit collapse of the passenger compartment of the vehicle in the event of the vehicle overturning. However, in cases where a pillar assembly defining an opening in the passenger compartment has a substantial rake, and particularly where the vehicle is convertible, the pillar assembly may have to withstand substantial loads if the vehicle should overturn. Conventional vehicle body assemblies can collapse in the event of the vehicle overturning.

OBJECT OF THE INVENTION

It is an object of the present invention to provide a vehicle body assembly which is more resistant to collapse of the passenger compartment in the event of the vehicle overturning.

SUMMARY OF THE INVENTION

According to the present invention there is provided a vehicle body assembly comprising a pillar assembly and a vehicle door including a quarterglass frame, wherein the quarterglass frame is provided with a channel member which in the closed position of the door extends around at least a part of the pillar assembly to provide support for the pillar assembly in the event of the vehicle overturning and which in the open position of the door is disengaged from the pillar assembly.

The channel member may be secured to or may be integral with the quarterglass frame of the door.

The channel member preferably extends around a lip formed by exposed ends of components making up the pillar assembly.

A seal may be positioned between the channel member and the pillar assembly in the closed position of the vehicle door.

The channel member is preferably substantially U-shaped in cross-section.

The channel member may be made of aluminium alloy.

BRIEF DESCRIPTION OF THE DRAWING

For a better understanding of the present invention and to show more clearly how it may be carried into effect reference will now be made, by way of example, to the accompanying FIGURE which is a sectional view of part of a vehicle body assembly according to the present invention.

DESCRIPTION OF PREFERRED EMBODIMENT

The FIGURE shows a part of a vehicle door 1 incorporating a quarterglass frame 2, for example of aluminium alloy, and quarterglass 3. The vehicle door is in its closed position in which the quarterglass frame lies adjacent to a windscreen frame 4 which carries a windscreen 5. A seal 6 is positioned between quarterglass frame 2 and windscreen frame 4.

Windscreen frame 4 is secured to A-post or pillar 7 as is the seal 6. A trim cover 8 extends around exposed ends of the pressed components, for example of sheet steel, making up a lip 9 of the pillar 7.

The pillar 7 may have a substantial rake and, particularly if the vehicle is convertible, may have to withstand substantial loads if the vehicle should overturn. In order to support the pillar 7 a channel member 10, for example of aluminium alloy, is secured to the leading edge of quarterglass frame 2 and in the closed position of the vehicle door 1 extends around the lip 9 of pillar 7. The channel member 10 is substantially U-shaped in cross-section. The arrangement of the channel member 10 does not inhibit opening of the door while providing support for the pillar 7 while the door is closed by passing forces tending to cause the pillar 7 to collapse through the body of the door. A seal 11 is attached to the pillar 7 and is positioned between the quarterglass frame and the pillar.

As an alternative to the channel member 10 being manufactured as a separate component and subsequently being secured to the quarterglass frame, the channel member may be manufactured integral with the quarterglass frame.

I claim:

1. A vehicle body assembly comprising a pillar assembly and a vehicle door including a quarterglass frame wherein the quarterglass frame is provided with a channel member which in the closed position of the door extends around at least a part of the pillar assembly to provide support for the pillar assembly in the event of the vehicle overturning and which in the open position of the door is disengaged from the pillar assembly.

2. A vehicle body assembly as claimed in claim 1, wherein the channel member is secured to the quarterglass frame of the door.

3. A vehicle body assembly as claimed in claim 1, wherein the channel member is integral with the quarterglass frame of the door.

4. A vehicle body assembly as claimed in claim 1, wherein the channel member extends around a lip formed by exposed ends of components making up the pillar assembly.

5. A vehicle body assembly as claimed in claim 1, wherein a seal is positioned between the channel member and the pillar assembly in the closed position of the vehicle door.

6. A vehicle body assembly as claimed in claim 1, wherein the channel member is substantially U-shaped in cross-section.

7. A vehicle body assembly as claimed in claim 1, wherein the channel member is made of aluminium alloy.

* * * * *